United States Patent [19]

Lavin, Sr. Gerald P.

[11] Patent Number: 4,812,075
[45] Date of Patent: Mar. 14, 1989

[54] INSIDE CORNER BRACKET

[76] Inventor: Lavin, Sr. Gerald P., 5210 Salinas Valley Dr., Apt. F, St Louis, Mo. 63128

[21] Appl. No.: 937,833

[22] Filed: Dec. 4, 1986

[51] Int. Cl.$^4$ ............................................. F16B 12/00
[52] U.S. Cl. ..................................... 403/403; 403/205
[58] Field of Search .................. 52/656, 657; 403/403, 403/402, 205, 382, 232.1, 231

[56] References Cited

U.S. PATENT DOCUMENTS

| | | | |
|---|---|---|---|
| 1,045,815 | 12/1912 | Courville | 403/231 |
| 1,209,032 | 12/1916 | Richens | 403/402 |
| 1,413,918 | 4/1922 | Lamb | 403/403 |
| 1,591,869 | 7/1926 | Wiedman | 403/403 X |
| 1,820,206 | 8/1931 | Wilson | 403/231 |
| 1,915,215 | 6/1933 | Carpenter | 403/403 |
| 2,039,125 | 4/1936 | Stuart | 403/403 |
| 4,024,691 | 5/1977 | Hansen et al. | 52/656 |
| 4,039,137 | 8/1977 | Smith | 248/248 |
| 4,068,967 | 1/1978 | Hoodis | 52/656 X |
| 4,095,915 | 6/1958 | Druell | 403/402 |
| 4,411,547 | 10/1983 | Johnson | 403/205 |
| 4,592,672 | 6/1986 | Ruch | 403/382 X |
| 4,665,676 | 5/1987 | Drzemala | 403/402 X |

FOREIGN PATENT DOCUMENTS

| | | | |
|---|---|---|---|
| 384449 | 2/1908 | France | 403/205 |
| 2129905 | 5/1984 | United Kingdom | 403/205 |

*Primary Examiner*—Randolph A. Reese
*Assistant Examiner*—Anthony Knight
*Attorney, Agent, or Firm*—Richard G. Heywood

[57] ABSTRACT

An inside corner bracket for attachment at an inside corner formed between angularly-related structural members, the corner bracket having two angularly-disposed channel members each having contiguous top, edge and bottom walls forming an outwardly opening channel, and the top or bottom walls of the channel members being integrally formed to rigidly interconnect the channel members in angular disposition with the edge walls defining the inside corner. A one-piece blank for forming such inside corner bracket.

11 Claims, 1 Drawing Sheet

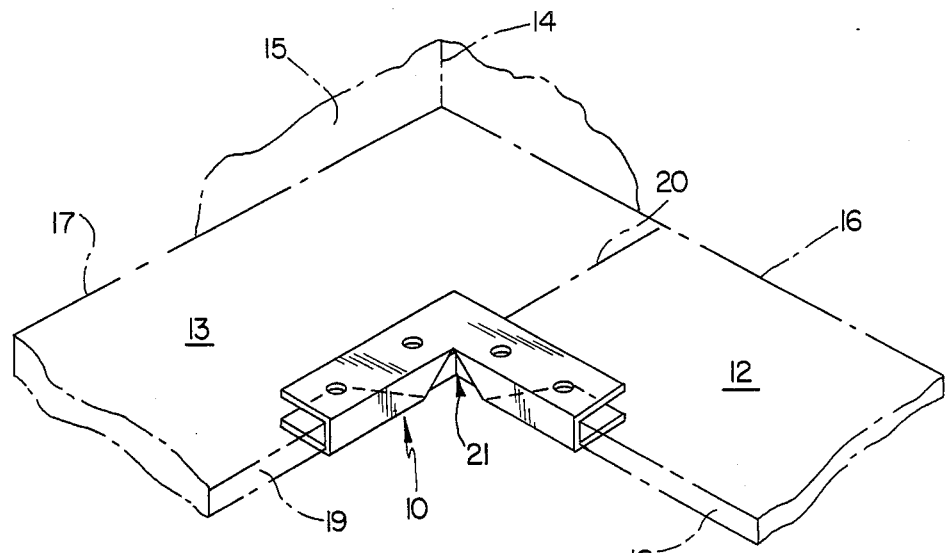
FIG. 1
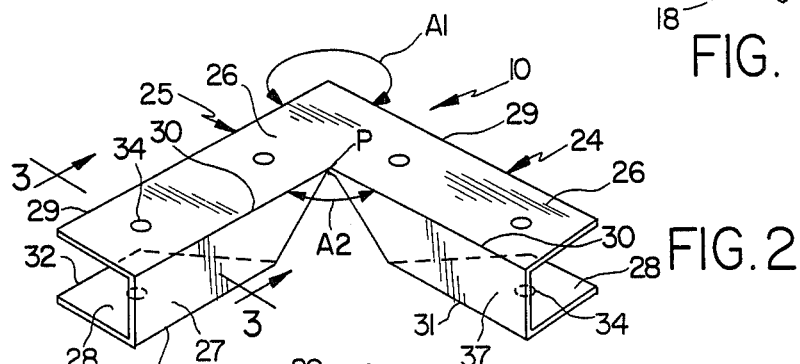
FIG. 2
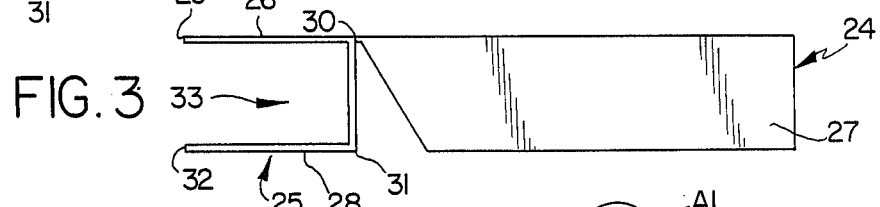
FIG. 3
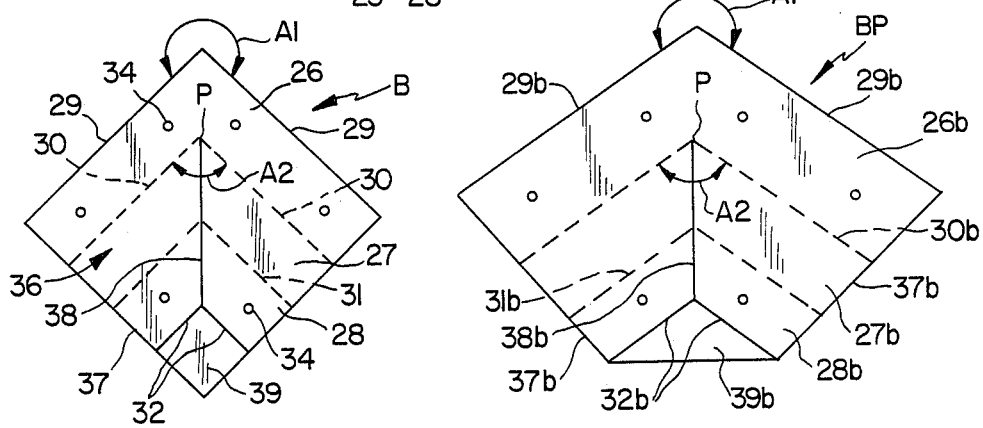
FIG. 4
FIG. 5

INSIDE CORNER BRACKET

The present invention relates generally to hardware brackets of the type used in construction and home repair for joining abutting structural members, and more particularly to a corner bracket for securing an inside corner of abutting shelf boards or the like.

BACKGROUND OF THE INVENTION

A wide variety of hardware brackets, clamps and fasteners have been used in the construction trades for joining and securing timbers and other structural members together in different arrangements. A principal problem area is the joinder of shelf boards or like structural members, and a typical solution has been to apply one or more straight or angle straps across the juncture of the two boards. A number of corner brackets or devices have been proposed for joining the corner frame pieces of door or window sash, as disclosed in U.S. Pat. Nos. 1,045,815; 1,591,869; 1,820,206; 2,039,125 and 4,039,137, but the prior art does not teach a simple, one-piece bracket applied at the inside corner of two shelf boards or like structural members and engageable with opposed surfaces thereof.

SUMMARY OF THE INVENTION

The invention is embodied in a corner bracket for attachment to an inside corner formed between two angularly-related structural pieces, the bracket comprising two angularly-disposed channel members each of which has spaced top and bottom walls interconnected by an inner edge wall and forming an outwardly opening channel, and the top or bottom walls being integrally formed to rigidly interconnect the channel members in angular disposition with the edge walls thereof defining an inside corner angle and the outwardly opening channels extending therefrom. The invention further comprises a one-piece blank for making the corner bracket.

A principal object of the present invention is to provide a corner bracket for securely fastening two adjoining shelf boards or like structural members, and which is strong, durable and easy to use.

Another object is to provide a corner bracket of bendable material that can be formed from a one-piece blank in a single operation, and which can be used by unskilled persons.

Another object is to provide a corner bracket that can be economically manufactured and sold, and which is attractive in appearance.

These and other objects will become apparent from the following description of the invention.

DRIEF DESCRIPTION OF THE DRAWINGS

In the accompanying drawings which form a part of the specification and wherein like numerals refer to like parts wherever they occur:

FIG. 1 is a perspective view showing the corner bracket invention as applied to structural members environmentally shown in phantom;

FIG. 2 is an enlarged perspective view showing a preferred embodiment of the invention;

FIG. 3 is a further enlarged cross-sectional view taken along line 3—3 of FIG. 2;

FIG. 4 is a top plan view of a one-piece blank for forming the embodiment of FIG. 2; and FIG. 5 is a top plan view showing a one-piece blank forming another embodiment of the invention.

DESCRIPTION OF THE PREFERRED EMBODIMENT

The preferred embodiment of the invention disclosed herein is shown as an inside corner bracket or brace 10 used to connect and strengthen two structural members 12 and 13 positioned in abutting relationship and defining an interior or inside corner therebetween. As used herein, "inside corner" shall mean the corner at the juncture between such structural members (12, 13) forming an angle in the range of 60°-150° and usually about 90°. Thus, although a right-angle (90°) corner bracket is disclosed, it will be understood that the invention is applicable to a wider range of inside corner angles, as will become apparent.

Referring to FIG. 1 of the drawings, the inside corner bracket 10 of the present invention is shown applied to a typical shelf construction in which the structural members are two shelf boards 12 and 13 arranged in perpendicular right-angle relationship as when mounted in the corner 14 defined by contiguous walls 15 of a room. The longitudinal shelf boards 12, 13 have wall contacting margins 16, 17 generally supported on and attached to firring strips (not shown) and free exposed marginal edges 18, 19 cantilevered into the room space. The end margin 20 of one board 12 abuts the edge margin of the other board 13, and an unattached inside corner 21 is formed at the juncture of the free margins 18, 19 of the two shelves 12, 13. The portion of the end margin 20 at the inside corner 21 remote from the wall 15 is otherwise unsupported and capable of flexing movement normal to the plane of the boards and the purpose of the present invention is to secure the two shelf boards 12, 13 together at this inside corner 21 to provide rigidity and strength to the shelf arrangement.

Referring to FIGS. 2 and 3, the preferred embodiment of the invention comprises an inside corner bracket unit 10 formed from a one-piece blank B to be described with reference to FIG. 4 hereinafter. The corner bracket 10 includes first and second angularly-related and rigidly interconnected channel members 24 and 25, each of which has contiguous serially connected top, edge and bottom forming walls 26, 27 and 28, respectively. The top or upper wall 26 has a free outer marginal edge 29, and the inner margin of the top wall 26 is connected to the upper margin of the edge forming wall 27 along a bend or foldline 30. The lower or bottom margin of the edge forming wall 27 is connected along another bend or foldline 31 to the inner margin of the bottom wall 28, and the bottom wall has a free outer marginal edge 32. The top and bottom walls 26 and 28 extend horizontally in parallel spaced planes normal to the vertical edge wall 27 and define an open channel 33 to receive the inner edge 18, 19 of a shelf board or like structural member 12, 13.

In the FIG. 2 embodiment, the top walls 26 of the two channel members 24 and 25 are integrally formed as an L-shaped bracket segment to rigidly interconnect these channel members 24 and 25 at right angles as an integral unit. Thus, the outer marginal edges 29 of the top wall 26 connect to form an exterior angle A1, and the inner margins thereof extending along bend lines 30 are substantially parallel to the outer edges 29 and connect at point P to form a complementary interior angle A2.

The inside corner bracket 10 is used by slipping it over the shelf boards 12, 13 at the inside corner 21 thereof with the shelf edges 18, 19 being received into the angularly-related open channels 33 so that the upper and lower wall flanges 26 and 28 are in surface contact with the top and bottom shelf surfaces and the edge forming walls 27 of the channel members 24 and 25 abut against the shelf edges 18 and 19. Openings 34 are provided in the top and bottom walls 26 and 28 for fasteners (not shown) to secure the corner bracket 10 to the shelf boards 12 and 13.

FIG. 4 illustrates the one-piece blank B for forming the inside corner bracket 10 of the FIG. 2 embodiment. The blank B may be formed of bendable material, such as sheet metal stock, that is cut, scored and punched in a single stamping operation. The blank B thus formed is of polygonal configuration, and FIG. 4 shows that a square body blank 36 is suitable for forming the right-angle corner bracket 10 of FIG. 2. The body blank 36 has first and second adjoining margins of substantially equal length which connect at exterior angle A1 and form the outer edges 29 of the top forming walls or segments 26, and two side margins 37 extend at right angles to these first and second outer margins (29) and will define the free ends of the channel members 24 and 25 when the corner bracket 10 is formed. The body blank 36 is preferably scored along bend lines 30, which extend from the side margins 37 inwardly to interior reference point P in parallel spaced relation with the first and second margins 29. Point P is centrally located in the body blank 36 inwardly of the exterior angle A1 and equidistant from the side margins 37, and point P defines the inside corner locus of the top wall 26 and the inside angle A2 between the marginal bend lines 30. A diagonal lance cut 38 is made in the body blank 36 extending from interior point P away from the exterior angle A1 across the body blank toward a remote point on the opposite marginal edge thereof, and which cut 38 is along a line that bifurcates the angles A1 and A2. The body blank on both sides of this cut 38 forms the edge and bottom forming walls 27 and 28 of the channel members 24 and 25, and the blank 36 is scored along bend lines 31 extending from the side margins 37 to the cut 38 in parallel spaced relation with the bend lines 30. The corner piece 39 of the square body blank 36 (FIG. 4) at the remote point opposite to the external angle A1 is cut out to form the free outer marginal edges 32 of the bottom forming wall 28. In the stamping operation forming the score lines (30, 31) and cuts (38, 32), the fastener openings 34 may also be punched in the body blank 36.

The channel members 24 and 25 of the inside corner bracket 10 formed from the square body blank 36 of FIG. 4 will be at right angles (interior angle A2), and the edges of the intermediate edge forming segment 27 and bottom wall segment 28 defined by cut 38 will be divergant away from interior point P when the walls 26, 27 and 28 are bent along bend lines 30 and 31.

It will be apparent that obtuse and acute inside corner brackets embodying the invention can also be formed from one-piece body blanks B. FIG. 5 illustrates a body blank BB having a main body 40 of pentagonal configuration for forming an obtuse inside corner bracket. In this form of the invention the exterior angle A1 formed by outer marginal edges 29B is smaller, and the complementary interior angle A2 is greater than 90°, such as 135°. The side margins 37b extend at right angles to the outer margins 29b in converging relationship so that the end margins of the corner bracket 10B, when formed, will be in perpendicular planes equidistant from interior point P defining the inside corner point of angle A2. The score lines 30b, 31b and the top, edge and bottom forming wall segments 26b, 27b and 28b formed thereby correlate to the construction of blank B (FIG. 4), and the cuts along lines 38b and 32b are also similar to FIG. 4 except that a triangular wedge 39b of material is discarded from the remote side of the blank BB opposite to the exterior angle A1.

It will be clear that an inside corner bracket 10 embodying the invention can also be formed by casting or molding the bracket as an integral one-piece unit, although manufacture in the preferred form produces economies in construction and packaging in flat blank form and the blank (B, BB) is easily bent in situ by do-it-yourself contractors.

The invention is intended to cover all modifications which will be readily apparent to those skilled in the art, and is only limited by the appended claims.

What is claimed is:

1. A corner bracket for connecting angularly-related structural pieces at an inside corner of less than 160° formed therebetween, said bracket comprising first and second channel members, each of which has spaced top and bottom wall portions interconnected only by an edge wall portion, said top, edge and bottom wall portions of each channel member being serially connected at substantially right angles, said edge and bottom wall portions of the first channel member being separated from the edge and bottom wall portions of said second channel member and only said top wall portions of said first and second channel members being integrally connected together at a predetermined angle to position the edge wall portions of said first and second channel members in intersecting planes forming an inside angle of less than 160° substantially corresponding to that of the inside corner of the structural pieces, and said top and bottom wall portions of each said channel member being in substantially parallel spaced relation and extending from said edge wall portion thereof in a direction outwardly away from the intersecting planes of said inside angle to form angularly related and outwardly opening channels for receiving such structural pieces at the inside corner thereof.

2. The corner bracket according to claim 1, in which said inside angle formed between said first and second channel members is substantially 90°.

3. The corner bracket according to claim 1 including at least one fastener receiving opening formed through each of said top and bottom wall portions of each of said channel members.

4. The corner bracket according to claim 1, which is formed of bendable material from a one-piece body blank.

5. A one-piece polygonal-shaped body blank of bendable material for forming an inside corner bracket, said polygonal blank comprising a body having two adjoining angularly-related outer margins of substantially equal length defining an exterior angle and two side margins extending from said outer margins toward a remote point located on a line bisecting said exterior angle, a diagonal cut along said line starting at an interior point spaced inwardly from said exterior angle and extending therefrom across said body toward said remote point, a first bend line extending from one of said side margins in substantially parallel spaced relation with one of said outer margins and terminating at said interior point opposite to said exterior angle, and a second bend line extending from said one side margin to said diagonal cut in substantially parallel spaced relation with said first bend line, and other bend lines extending from the other side margin to said diagonal cut.

6. The one-piece body blank according to claim 5, in which a first wall segment is formed between said one outer margin and said first bend line, a second wall segment is formed between said first and second bend lines, and a second cut in said body blank extending from said one side margin to said diagonal cut in substantially parallel spaced relation with said second bend line to form a third wall segment therebetween.

7. The one-piece body blank according to claim 5, in which said other bend lines include a third bend line which extends from the other side margin in substantially parallel spaced relation with the other outer margin and terminates at said interior point to form a predetermined inside angle between said first and third bend line, and a fourth bend line which extends from said other side margin substantially parallel with said third bend line to intersect at said diagonal cut with said second bend line.

8. The one-piece body blank according to claim 7, in which said side margins extend substantially perpendicular to said outer margins and in converging relationship and said diagonal cut is located equidistant from said side margins, and a second cut in said body blank extending from both side margins and substantially parallel to said second and fourth bend lines.

9. The one-piece body blank according to claim 8, in which angularly interconnected top wall segments are formed between said outer margins and said first and third bend lines, separate edge wall segments are formed between the respective first and second bend lines and third and fourth bend lines, and separate bottom wall segments are formed on the side of the respective second and fourth bend lines remote from said outer margins.

10. The one-piece body blank according to claim 9, in which the top, edge and bottom wall forming segments are sequentially connected on each side of said diagonal cut and are bendable along the respective connecting bend lines therebetween to form an inside corner bracket having angularly-related channels connected only by said top wall segments.

11. An inside corner bracket formed from the one-piece body blank of claim 10.

* * * * *